United States Patent
Kothari et al.

(10) Patent No.: US 9,176,746 B2
(45) Date of Patent: Nov. 3, 2015

(54) DATA TEMPLATES IN USER INTERFACE ELEMENTS

(75) Inventors: Nikhil Kothari, Sammamish, WA (US); Simon Calvert, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1161 days.

(21) Appl. No.: 11/375,859

(22) Filed: Mar. 15, 2006

(65) Prior Publication Data

US 2007/0220436 A1    Sep. 20, 2007

(51) Int. Cl.
*G06F 3/048* (2013.01)
*G06F 9/44* (2006.01)
*G06F 3/0481* (2013.01)

(52) U.S. Cl.
CPC ............ *G06F 9/4443* (2013.01); *G06F 3/0481* (2013.01)

(58) Field of Classification Search
CPC .................................................... G06F 3/0481
USPC .......................................... 715/744, 853, 765
See application file for complete search history.

(56) References Cited

U.S. PATENT DOCUMENTS 6,817,008 B2 * 11/2004 Ledford et al. ................ 717/102
2003/0237046 A1 * 12/2003 Parker et al. ................... 715/513

* cited by examiner

*Primary Examiner* — Andrey Belousov
(74) *Attorney, Agent, or Firm* — Brian Haslam; Aaron Hoff; Micky Minhas

(57) ABSTRACT

A data template that is used to generate arbitrary data of a user interface element that is part of the hierarchy of user interface elements used to render a user interface. The data template is used to generate the arbitrary data of the user interface element, even though that component is not also a user interface element. This contrast with the use of a user interface template which is used to generate the user interface element itself. This permits for greater control in defining the layout, content, and/or the look and feel of portions of the user interface element.

20 Claims, 3 Drawing Sheets

DATA TEMPLATES IN USER INTERFACE ELEMENTS

BACKGROUND

Computing technology has contributed enormously to the advancement of humankind. Computing systems come in a wide variety of physical forms including desktop computers, laptop computers, personal digital assistants, telephones, and even devices that have not been conventionally thought of as computing systems such as, for example, refrigerators and automobiles. Thus, a computing system may be any device or system that has a processor and a memory of any type. Computing systems may even have constituent computing systems that collaborate together as in network systems. Accordingly, some computing systems may fit easily into the palm of the hand, while others may be distributed globally.

Computing systems operate at the direction of software. Some software involves interfacing with a user using one or more input devices and a display. The physical form of such input devices and displays may vary considerably given the characteristics of the computing system itself. A user interface is often implemented by rendering elements and controls on the display, and allowing the user to interface with the controls to direct particular actions. Often the interface is implemented in the form of a logical, hierarchical structure of user interface elements. Each of the user interface elements has logic associated with it that permits that user interface to perform certain behaviors.

A wide variety of conventional frameworks, particularly user interface frameworks, use hierarchical user interface element structures to render user interfaces. Such frameworks include, for example, ASP.Net in which such user interface elements are referred to as "user interface controls" or "UI controls". Examples of user interface elements in the ASP-.NET framework include pages, labels, list boxes, buttons, panels, text boxes, maps, datalists, and so forth. However, the types of user interface elements may differ framework by framework.

Many of such conventional frameworks use templates at the level of the user interface element to customize the associated display of the user interface element. Such templates will be referred to as user interface templates, while the user interface elements that contain a user interface template will sometimes be referred to as "templated" user interface elements. The user interface element will be generated using the user interface template such that the template defines the layout, some content characteristics, and/or the look and feel of the user interface element. While the user interface templates are used to apply rules to the generation of the user interface element itself, they are not used to apply rules (e.g., layout, content, look and feel) for arbitrary data contained within user interface elements. Accordingly, it is much more difficult to customize this arbitrary data of a user interface element, as opposed to customizing the user interface element itself.

BRIEF SUMMARY

Although not required, embodiments of the present invention relate to the use of a data template to generate arbitrary data of a user interface element that is part of the hierarchy of user interface elements used to render a user interface. This contrasts with the use of a user interface template which is used to generate the user interface element hierarchy itself. This permits for greater control in defining the layout, content, and/or the look and feel of portions of the user interface element, without requiring that the arbitrary data having to be itself created as a user interface element.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The appended drawings are used in order to more particularly describe embodiments of the present invention. Understanding that these drawings depict only typical embodiments of the invention and are not therefore to be considered to be limiting of its scope, the embodiments will be described and explained with additional specificity and detail through the use of the accompanying drawings in which.

DETAILED DESCRIPTION

Embodiment of the present invention extend to the use of templates to define layout and content, and look or feel of relevant arbitrary data in a user interface element, as compared to using a template for the hierarchy of elements within a user interface element. A suitable computing system in which embodiments of the present invention may be employed will first be described with respect to FIG. 1. Then, embodiments of the present invention will be described with respect to the subsequent FIGS. 2 and 3.

Figure 1:
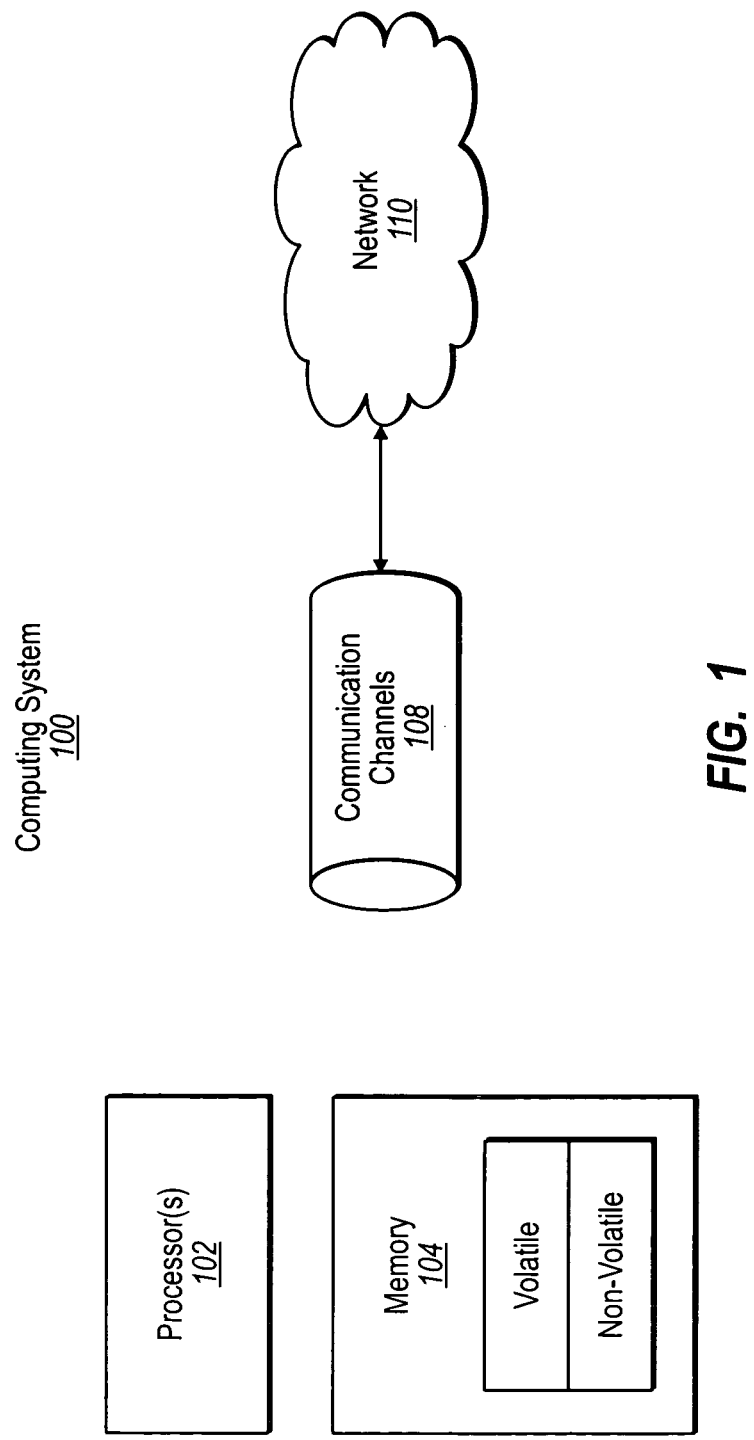
FIG. 1 illustrates a computing system in which embodiments of the principles of the present invention may operate.

The embodiments of the present invention may comprise a special purpose or general-purpose computer including various computer hardware, as discussed in greater detail below. FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be system memory, which may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage such as physical storage media. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions.

Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
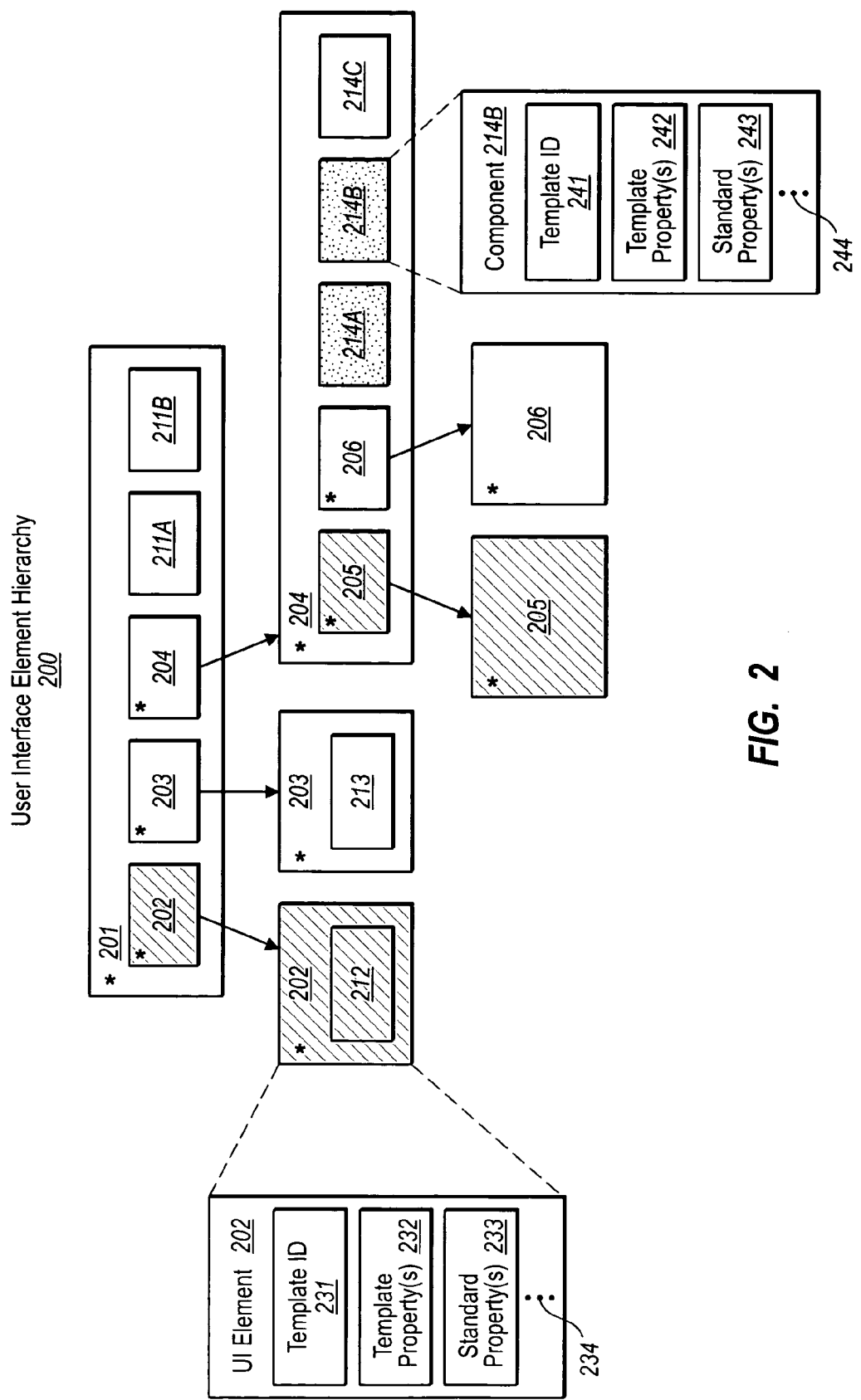
FIG. 2 illustrates a hierarchical structure of user interface elements in which embodiments of the present invention may operate.

FIG. 2 illustrates a hierarchical structure 200 in which each node in the hierarchy represents a user interface element. While hierarchical structures of user interface elements may be as few as a single node representing a single user interface element, the hierarchical structure may also be quite complex. The principles of the present invention are not limited to the number of user interface elements in the hierarchical structure, nor are they limited to the precise topology of the hierarchical structure itself. Accordingly, the hierarchical structure 200 of FIG. 2 is shown for illustrative purposes only. In the particular example of FIG. 2, the hierarchical structure 200 includes six user interface element nodes 201 through 206. The user interface element hierarchy may be present in the memory and/or storage of the computing system 100 of FIG. 1, when operating in that environment. The user interface element hierarchy may include a textual representation of the hierarchy as well as an in-memory representation of the hierarchy that is desired from the textual representation.

A user interface element contains logic that is used to generate a portion of a user interface. A user interface element that may be programmed against is sometimes referred to as a "control". While the principles of the present invention are not limited to any particular user interface framework or user interface element types, examples of user interface elements include pages, labels, list boxes, buttons, panels, text boxes, maps, datalists, and so forth. In a typical user interface framework, a "page" is the parent node in a hierarchical structure of user interface elements, while the other kinds of user interface elements may represent intermediate or child nodes in such a hierarchical structure.

Referring back to FIG. 2, each user interface element has content in the form of one or more components. In some cases, the components may themselves be user interface elements. In other cases, the component is not a user interface element, but is just some arbitrary data. A user interface element may contain multiple user interface elements. For instance, a page user interface element may contain multiple user interface elements. In the example of FIG. 2, the user interface element 201 contains components 202, 203 and 204, which are also user interface elements that are included in the hierarchical tree. Similarly, component 204 has components 205 and 206, which are also user interface elements. The six user interface elements of FIG. 2 are labeled with an asterisk in the upper left corner.

The user interface elements may also contain non-user interface components, also referred to herein as "arbitary data". For instance, user interface element 201 contains non-user interface components 211A and 211B, user interface elements 202 and 203 contain respective non-user interface components 212 and 213, and user interface element 204 includes arbitrary data portions 214A through 214C.

Some of the user interface elements are templated. This is represented by the corresponding element being cross-hatched. For instance, in FIG. 2, the user interface elements 202 and 205 are cross-hatched in their entirety. The templated user interface elements are used to apply customization to user interface elements as an alternative to or in addition to any customization allowed by standard properties associated with a user interface element.

For instance, a telescopic view of user interface element 202 shows that the user interface element 202 may include a template identifier 231 that identifies that a template is to be applied to the user interface element. In addition, one or more template properties 232 may be set. One or more standard properties 233 of the user interface element may also be set to customize the layout or content of the user interface element. As with the other user interface elements, the user interface element 202 may include additional content as represented by the vertical ellipses 234.

Figure 3:
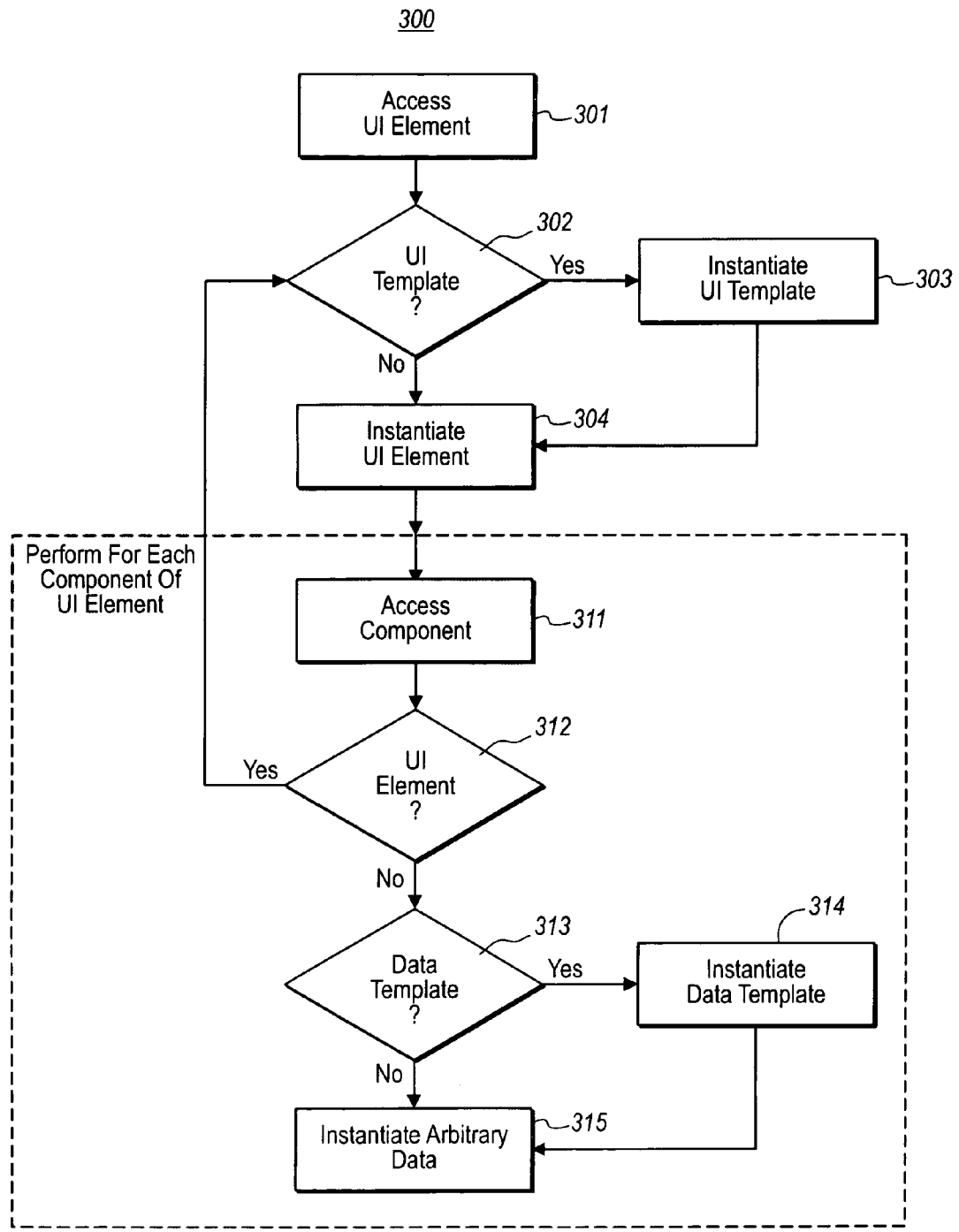
FIG. 3 illustrates a flowchart of a method for rendering a user interface element in accordance with an embodiment of the present invention in which data templates are used.

FIG. 3 illustrates a flowchart of a method 300 for rendering a user interface element in accordance with embodiments of the present invention. The method 300 may be performed for each user interface element in the user interface element hierarchy to be displayed. The method 300 may be performed by the computing system 100 of FIG. 1. For instance, the computing system 100 may contain a computer program product that may be represented by or may be included in the memory 104. The computer program product may contain computer-executable instructions that, when executed by the processor(s) 102, causes the computing system 100 to perform the method 300. Alternatively or in additions, part or all of the method 300 may be performed using hardware or a combination of hardware and software. As the method 300 may be performed on the user interface hierarchy 200 of FIG. 2, the method 300 of FIG. 3 will be described with frequent reference to the user interface element hierarchy 200 of FIG. 2.

The method 300 includes the accessing of a representation of a user interface element (act 301). For example, a representation of an appropriate user interface element 201-206 of FIG. 2 may be accessed. This representation may be in text-form, although that is not required. The following shows an example of a textual representation of a user interface element with line numbering added for clarity, and will be referred to as the "first example" hereinafter:

```
1.    <ListBox>
2.       <ItemTemplate>
3.          <ListItem Color = "Green"
4.             Text=Bind("Name")
5.             Value=Bind("ID")>
6.          </ListItem>
7.       </ItemTemplate>
8.       ...
9.    </ListBox>
```

In this example, the representation of the text element is text-based markup language, perhaps eXtentible Markup Language (XML), although such a representation is not required. The representation may not even be human-readable or may not even be textual whatsoever.

In the first example, however, lines 1 and 9 identify that the material from lines 2 to 8 represent content and properties of a ListBox, which is a user interface element defined under the user interface framework of ASP.net. As such, the ListBox is analogous to the user interface element 204 of FIG. 2 when represented in textual form, and in which the ListItem component is a non user interface templated component (i.e., templated arbitrary data), which is analogous to the templated component 214B when represented in textual form.

Lines 2-7 identify an "ItemTemplate", which is simply a representation of a data template to be applied on the ListItem component represented by lines 3-6. The ListItem component contains bindings (as represented in lines 4 and 5) to external data in which the Text field of the list item is bound to the Name field of the external data, and in which the Value field of the list item is bound to the ID field of the external data. If there are multiple items of external data, then the list item component may be instantiated multiple times, with the data template being applied to each instance. Line 8 shows a simple ellipses representing that the user interface element may have further components. In the first example, the list items are components of the user interface element that are not themselves user interface elements.

If the first example is a representation of the user interface element 204 of FIG. 2, then the "ItemTemplate" identification in lines 2 and 7 might be an example of the templating of component 214B. The template properties (e.g., template properties 242 of FIG. 2) may be the attribute "Color='green'" attribute, specifying that the data is to be presented in the color green. The template properties may also include the binding properties specified in lines 4 and 5. Other standard properties and other component may be represented in the user interface element representation as symbolized by the ellipses in line 8 of the first example, and as represented by the standard property(s) 243 and the vertical ellipses 244 of FIG. 2.

Referring to FIG. 3, after the representation of the user interface element is accessed (act 301), the corresponding user interface element is generated. This may comprise formulation and instantiation of an initial in-memory version of the user interface template. For instance, in the first example, an initial perhaps unpopulated version of the list box is instantiated in memory. An embodiment of this generation process is described by the remainder of FIG. 3.

For instance, if the user interface element does not have a user interface template (No in decision block 302), the default version of the user interface element is simply instantiated (act 304). For instance, in the case of FIG. 2, the user interface elements 201, 203, 204 and 206 are not templated even though components thereof may be templated. Accordingly, the user interface elements are instantiated (act 304) without the aid of a user interface template that is applied to the user interface element as a whole. In the first example, the ListBox user interface element does not itself have a template, even though one of its components (i.e., the multi-instance "ListItem" component) does have a template.

On the other hand, if the user interface element does have a user interface template (Yes in decision block 302), the user interface template is instantiated (act 303). The instance of the user interface template then generates the instance of the user interface element or perhaps to add to an instance of the user interface element (act 304). For instance, in the case of FIG. 2, the user interface elements 202 and 205 are cross-hatched, representing that they are templated user interface elements.

The remainder of the method 300 is performed for each component in the user interface element, whether that component is itself a user interface element, or whether that component is arbitrary data. For instance, the system accesses a representation of the component within the user interface element representation (act 311). If the component is itself a user interface element (Yes in decision block 312), then the method 300 may recursively return to the decision block 302 after which that user interface element is generated. For instance, referring to FIG. 2, user interface elements 202-204 are each components of the user interface element 201. Similarly, the user interface elements 205 and 206 are each components of the user interface element.

On the other hand, if the component is not a user interface element, but is simply some arbitrary data (No in decision block 312), an evaluation is made as to whether or not that data has a data template (decision block 313). If the component does not have an associated data template (No in decision block 313), then the arbitrary data is simply rendered (act 315) without the use of a data template. For instance, in FIG. 2, each of the non-user interface element components 211A, 211B, 213 and 214C are not templated.

On the other hand, if the component does have an associated data template (Yes in decision block 313), then the data template is instantiated (act 314), and the arbitrary data is rendered (act 315) using the data template. In the case of FIG. 2, non-user interface components 214A and 214B are templated by data templates as represented by their being dot-filled. In the case of the first example, the list item component has an associated item data template. Accordingly, the data template may be sued to create or supplement multiple instances of the list items. In the first example, each of the list item components will be generated using the color green and with the specified binding to external data. In this way, the data templates may be used to affect a layout, content, and/or look and feel of the arbitrary as directed by the data template.

The following is a text representation of a user interface element in the form of a map user interface element with line numbering added for clarity, and will be referred to hereinafter as the "second example":

```
1.   <Map>
2.       <PushPinTemplate Effect="FlashWhenSelected">
3.           <PushPin Image = "Track.jpg"
4.               Latitude = Bind("Lat")
5.               Longitude = Bind("Long")
6.               Text = Bind("Name")>
7.           <PopupTemplate>
8.               <Popup>
9.                   <Label>
10.                      ...
11.                  </Label>
12.                  <Image>
13.                      ClassicPopup.jpg
14.                  </Image>
15.              </Popup>
16.          </PopupTemplate>
17.          </PushPin>
18.      <PushPinTemplate>
19.      ...
20.  </Map>
```

This second example shows how a user interface element (i.e., the map user interface element spanning lines 1-20) may use both a data template (e.g., lines 2-18) for a component of arbitrary data (e.g., the push pin component spanning lines 3-17), and also a user interface template (i.e., lines 7-16) for a user interface element (e.g., the popup element spanning lines 8-15). Indeed, the user interface template is a property of the non-user interface push pin component. In this case, the component template is once again a multi-instance component template since it is used to generate multiple push pin components depending on the number of items or pushpins that are bound. Nevertheless, the principles of the present invention may be easily applied to single-instance component templates as well, without limitation.

Accordingly, the principles of the present invention provide the ability to use a component template to define the layout, content, and/or look and feel of a component of a user interface element, even if that component is not itself a user interface element. In the past, without component templates, properties of the components within the component template had to be specified on the templated control. This does not scale, as the components within the template become increasingly complex.

Component templates allow both static properties and bound properties to be specified on items within the template as demonstrated by the above first and second examples. In the past, either you could only specify bound properties, or you needed to have two properties for each property on the templated control.

Furthermore, bound properties may need additional information such as formatting, which also had to be surfaced on the templated control. A common binding pattern is to build support for change notifications and automatic bi-directional binding between the source and target of the data. With component templates, the objects within the template automatically benefit from the core binding infrastructure, since they contain bindings as first class properties. In the non-component template world, true bindings do not exist.

Essentially when using a data template, the templated user interface element creates instances of components or "arbitrary data" items defined by the template. It does not need to provide a parent which is only required for UI scenarios where parenting of the newly created user interface elements is an essential aspect of pattern.

The templated control can provide a data context to be used for the newly instantiated objects, in much the same way it can do so for user interface elements. This data context is used to provide a context against which bindings are evaluated; change notification handlers are associated etc.

While the principles of the present invention may be accomplished using a wide-variety of techniques including those disclosed herein, in one embodiment, they are accomplished using an Application Program Interface, an example of which will now be described.

A definition for a data template may appear, for example, as follows:

```
public interface IDataTemplate {
    TemplateInstance Instantiate(object dataContext,
                Callback instanceCreatedCallback,
                object callbackContext);
}
public class TemplateInstance {
    public object instance;
    public object callbackResult;
}
```

Several of examples of templated user interface elements that use component templates are as follows:

```
public class ListControl {
    public IDataTemplate ItemTemplate { get; set; }
}
public class Map {
    public IDataTemplate PushpinTemplate { get; set; }
}
```

An example of how the developer might use these templated controls is included as the first and second examples presented above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for rendering a user interface control, the method comprising:
    accessing a hierarchical user interface description that includes a definition of parent user interface element and a definition of at least one child user interface element, the definition of the child user interface element including:
        a templated definition of a child user interface control that is to be visually displayed within the parent user interface element, the templated definition of the child user interface control including:
            a first template identifier that identifies a user interface template that defines a customization of one or more visual properties of the corresponding child user interface control, when the child user interface control is rendered at the user interface;
            one or more first template properties corresponding to the user interface template; and
            one or more first standard properties for customizing one or more of the layout or content of the child user interface control; and
        a templated definition of a non-user interface component that is to be applied to the child user interface control, when the child user interface control is rendered at the user interface, the templated definition of the non-user interface component including:
            a second template identifier that identifies a data template that defines a customization to the non-user interface component, including a customization of one or more visual properties of the arbitrary data corresponding to the non-user interface component;
            one or more second template properties corresponding to the data template; and
            one or more second standard properties for customizing the non-user interface component; and
    generating the parent user interface element and the child user interface control that is represented by the hierarchical user interface description, including:
        using the first template to customize the one or more visual properties of the child user interface control; and
        using the second template to customize the one or more visual properties of the arbitrary data.

2. A method in accordance with claim 1, wherein using the second template to customize the one or more visual properties of the arbitrary data comprises:
    affecting a layout of the arbitrary data within the child user interface control as directed by the second template.

3. A method in accordance with claim 2, wherein using the second template to customize the one or more visual properties of the arbitrary data comprises:
    affecting content of the arbitrary data as directed by the second template.

4. A method in accordance with claim 1, wherein using the second template to customize the one or more visual properties of the arbitrary data comprises:
    affecting content of the arbitrary data as directed by the second template.

5. A method in accordance with claim 1, wherein the second template is a single-instance data template.

6. A method in accordance with claim 1, wherein the second template is a multi-instance data template, and wherein using the second template to customize the one or more visual properties of the arbitrary data comprises generating a plurality of instances of the arbitrary data.

7. A method in accordance with claim 1, wherein the child user interface control comprises one or more of the group consisting of pages, labels, list boxes, buttons, panels, text boxes, maps, or datalists.

8. A method in accordance with claim 1, wherein the hierarchical user interface description includes one or more user interface elements of the group consisting of pages, labels, list boxes, buttons, panels, text boxes, maps, or datalists.

9. One or more physical storage or memory computer-readable media having thereon a data structure that defines a hierarchical user interface description that includes a definition of parent user interface element and a definition of at least one child user interface element, the definition of the child user interface element comprising:
    a templated definition of a child user interface control that is to be visually displayed within the parent user interface element, the templated definition of the child user interface control including:
        a first template identifier that identifies a user interface template that defines one or more rules for how the child user interface control is to be generated, when rendered, in terms of one or more of layout, content, or look and feel of the child user interface control;
        one or more first template properties that modify one or more properties of the first template; and
        one or more second standard properties that modify one or more visual properties of the child user interface control; and
    a templated definition of a non-user interface component that is to be applied to the child user interface control, when the child user interface control is rendered at the user interface, the templated definition of the non-user interface component including:
        a second template identifier that identifies a data template that defines one or more rules for how the non-user interface component is to be generated within the child user interface control, including how arbitrary data of the non-user interface component is to be rendered, in terms of one or more of layout, content, or look and feel of the arbitrary data within the child user interface control;
        one or more second template properties corresponding to the data template; and
        one or more second standard properties for customizing the non-user interface component.

10. One or more physical storage or memory computer-readable media in accordance with claim 9, wherein the arbitrary data is first arbitrary data, the child user interface element further comprising:
    second arbitrary data of the non-user interface component that is to be applied to the child user interface control, when rendered; and
    a third template identifier that identifies an additional data template that defines one or more rules for how the second arbitrary data is to be generated within the child user interface control, when rendered, in terms of one or more of layout, content, or look and feel of the second arbitrary data within the child user interface control.

11. A hierarchical structure hosted on one or more memory or physical storage, the hierarchical structure comprising:
    a hierarchical user interface description that includes a definition of parent user interface element and a definition of at least one child user interface element, the definition of the child user interface element including:
        a templated definition of a child user interface control that is to be visually displayed within the parent user interface element, the templated definition of the child user interface control including:
- a first template identifier that identifies a user interface template that defines a customization of one or more visual properties of the child user interface control, when the child user interface control is rendered at the user interface;
- one or more first template properties corresponding to the user interface template; and
- one or more first standard properties for customizing one or more of the layout or content of the child user interface control; and a templated definition of a non-user interface component that is to be applied to the child user interface control, when the child user interface control is rendered at the user interface, the templated definition of the non-user interface component including:
- a second template identifier that identifies a data template that defines a customization to the non-user interface component, including a customization of one or more visual properties of the arbitrary data corresponding to the non-user interface component;
- one or more second template properties corresponding to the data template; and
- one or more second standard properties for customizing the non-user interface component.

12. A hierarchical structure in accordance with claim 11, wherein the child user interface control comprises one from the group consisting of labels, list boxes, buttons, panels, text boxes, maps, or datalists.

13. A hierarchical structure in accordance with claim 11, wherein the child user interface control further includes a second user interface control, and generating each user interface control comprises generating the second user interface control without using a template.

14. A method in accordance with claim 1, wherein the arbitrary data includes:
- one or more bindings to external data that is to be displayed in connection with the child user interface control; and
- one or more properties of the arbitrary data that affect the visual appearance of the external data.

15. A hierarchical structure in accordance with claim 11, wherein the arbitrary data includes:
- one or more bindings to external data that is to be displayed in connection with the child user interface control; and
- one or more properties of the arbitrary data that affect the visual appearance of the external data.

16. A computer system, comprising:
- one or more hardware processors; and
- one or more hardware storage devices having stored thereon computer-executable instructions that are structured such that, when executed by the one or more hardware processors, the computer-executable instructions configure the computer system render a user interface control, including computer-executable instructions that configure the computer system to perform at least the following:
  - access a hierarchical user interface description that includes a definition of parent user interface element and a definition of at least one child user interface element, the definition of the child user interface element including:
    - a templated definition of a child user interface control that is to be visually displayed within the parent user interface element, the templated definition of the child user interface control including:
      - a first template identifier that identifies a user interface template that defines a customization of one or more visual properties of the child user interface control, when the child user interface control is rendered at the user interface;
      - one or more first template properties corresponding to the user interface template; and
      - one or more first standard properties for customizing one or more of the layout or content of the child user interface control; and
    - a templated definition of a non-user interface component that is to be applied to the child user interface control, when the child user interface control is rendered at the user interface, the templated definition of the non-user interface component including:
      - a second template identifier that identifies a data template that defines a customization to the non-user interface component, including a customization of one or more visual properties of the arbitrary data corresponding to the non-user interface component;
      - one or more second template properties corresponding to the data template; and
      - one or more second standard properties for customizing the non-user interface component; and
  - generate the parent user interface element and the child user interface control that is represented by the hierarchical user interface description, by at least:
    - using the first template to customize the one or more visual properties of the child user interface control; and
    - using the second template to customize the one or more visual properties of the arbitrary data.

17. The computer system of claim 16, also including computer-executable instructions that configure the computer system to affect a layout of the arbitrary data within the child user interface control as directed by the second template, when using the second template to customize the one or more visual properties of the arbitrary data.

18. The computer system of claim 16, also including computer-executable instructions that configure the computer system to affect content of the arbitrary data as directed by the second template, when using the second template to customize the one or more visual properties of the arbitrary data.

19. The computer system of claim 16, wherein the second template is a multi-instance data template, and wherein using the second template to customize the one or more visual properties of the arbitrary data comprises generating a plurality of instances of the arbitrary data.

20. The computer system of claim 16, wherein the arbitrary data includes:
- one or more bindings to external data that is to be displayed in connection with the child user interface control; and
- one or more properties of the arbitrary data that affect the visual appearance of the external data.

* * * * *